A. TILLEY.
OVERSHOE FOR HORSES AND THE LIKE.
APPLICATION FILED MAR. 18, 1912.

1,045,912.

Patented Dec. 3, 1912.

Witnesses

Inventor
Allan Tilley.
By
His Attorney.

UNITED STATES PATENT OFFICE.

ALLAN TILLEY, OF BROCKVILLE, ONTARIO, CANADA.

OVERSHOE FOR HORSES AND THE LIKE.

1,045,912.  Specification of Letters Patent.  Patented Dec. 3, 1912.

Application filed March 18, 1912. Serial No. 684,550.

*To all whom it may concern:*

Be it known that I, ALLAN TILLEY, of the city of Brockville, in the Province of Ontario and Dominion of Canada, have invented new and useful Improvements in Overshoes for Horses and the Like, of which the following is a full, clear, and exact description.

This invention relates to improvements in over shoes for horses and is adapted for winter use.

The primary object of the invention is to provide an over shoe which may be applied to a horse's hoofs with equal facility whether the horse is shod or unshod, and which will not slip off the horse's hoof when once in position.

A further object is to provide an over shoe for horses having road gripping members of large area which may be readily renewed when worn out, thus retaining the original body of the shoe.

A still further object is to provide a shoe which may be extended or adjusted to fit all sizes of hoofs from the smallest to the largest.

The invention consists essentially of a pair of similar members adapted to fit under the sides of a horse's hoof, said members being connected by an adjustable clamp, and having upturned flanges which are connected by straps running over the toe and heel of the horse's hoof. The shoe thus formed is provided with suitable road gripping members which may be readily replaced when worn out.

Figure 1:
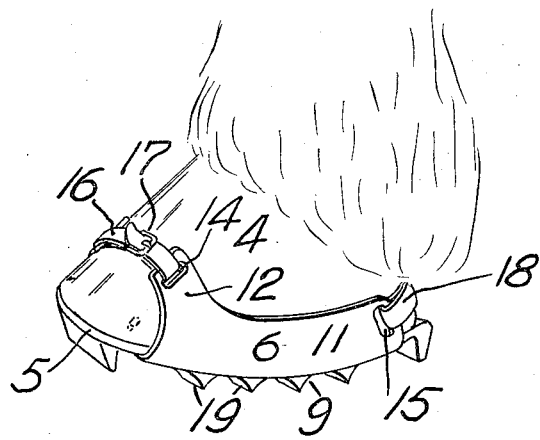
Figure 2:
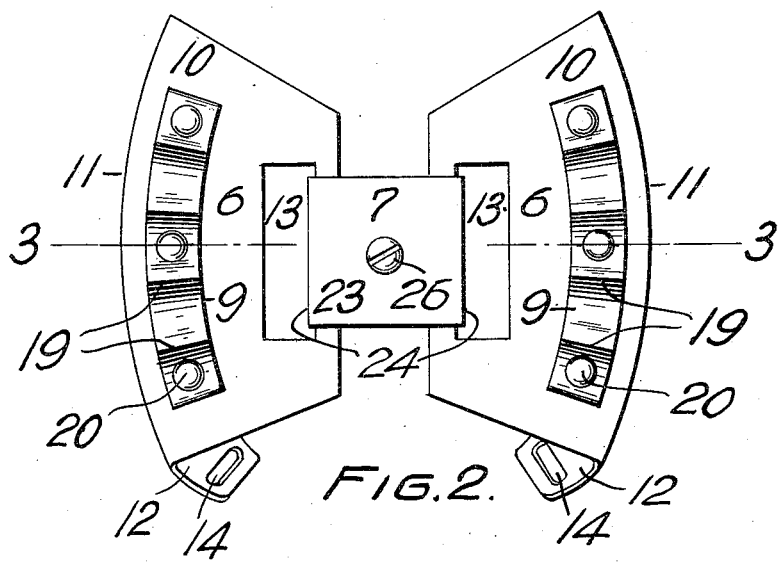
Figure 3:
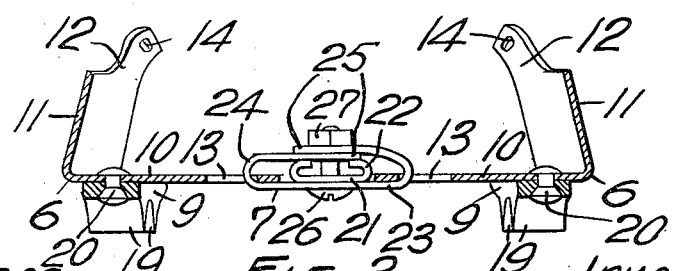

In the drawings which illustrate this invention:—Figure 1 is a perspective view of the over shoe in position on a horse's hoof, the hoof being shown sharp shod. Fig. 2 is a bottom plan view of the shoe, the straps being omitted. Fig. 3 is a cross sectional view on the line 3—3, Fig. 2.

Referring more particularly to the drawings, 4 designates the horse's hoof, which is shown in the drawings as shod with shoe 5 of usual form. The over shoe consists essentially of a pair of similar members 6 connected under the hoof by an adjustable clamp 7 and over the hoof by straps 16 and 18. Each of these members is provided with a road gripping member 9.

Each of the members 6 consists of a substantially flat plate 10 of a regular shape having one edge thereof curved to conform approximately to the curvature at the side of a horse's hoof. This plate is provided at the curved edge with an upwardly projecting flange 11 which may if desired be sloped slightly toward the opposite edge of the plate, as shown in Fig. 3. One end of this flange, which is considered as the toe of the shoe, is provided with an angularly disposed extension 12 which is adapted to curve over the sloping front of the horse's hoof, as clearly shown in Fig. 1. The plate 10 is provided with a comparatively large aperture 13 on the opposite side thereof from the flange 11, while the extension 12 of the flange is provided with a small aperture or slot 14, and the opposite end of the flange or heel of the shoe is provided with a similar aperture 15. The clamp 7 passes through the apertures 13 in two members 6 and connects them to form the shoe, while a strap 16 passes through the apertures 14 and connects the two sides of the toe of the shoe, the strap passing over the slope of the front of the hoof and being drawn tight and fastened by means of a buckle 17 or other suitable device. A second strap 18 passes through the apertures 15 and connects the two sides of the heel, the strap passing over the sloping portion at the rear of the hoof and being drawn tight and secured similarly to the toe strap 16. It is obvious from the drawings that a shoe constructed in this manner cannot possibly become dislodged or slip down over the horse's hoof while the straps remain intact.

The road gripping members 9 are preferably curved to conform approximately to the curvature at the outer edge of the shoe. These members are provided with a series of ridges or corrugations 19 which are sharpened at their lower edges and spaced sufficiently far apart to obtain a good grip of the road, the corrugations running transversely of the horse's hoof. These grips are secured to the under side of the plate 10 adjacent the curved edge thereof by means of rivets 20 or other suitable fastenings.

The clamp 7 which connects the two portions of the shoe under the horse's hoof consists of a strap 21 of metal turned over at its ends, as shown at 22, so as to form hooks which may be inserted through the apertures 13 of the plates, the ends of said strap being spaced a suitable distance apart. This strap 21 forms the inner member of the clamp.

The outer member consists of a strap 23 of the same width as the inner strap and bent over at 24, so that the ends 25 overlap and close the gap between the ends of the strap 22. It will be seen that the strap 23 is also provided with hooks, which are formed at the bends 24 and which may be inserted through the apertures 13. A bolt 26 passes through the center of the strap 23 and through the ends thereof, the head of said bolt being on the outer or lower side of the shoe, while the nut 27 is on the inside. When the horse is shod, the thickness of the shoe will keep the nut away from the hoof, but if the horse is unshod the nut will not be harmful as it will lie in the center of the hoof. Each clamp is capable of adjusting the shoe to three sizes, that is to say, the outer strap or the inner strap may be passed through the apertures, or one end of each. It will be noticed that the apertures 13 are of considerable width. When the outer strap is passed through the apertures, the inner strap lies between the adjacent edges of the plates 10, but when the inner strap is placed in the apertures, the bends of the outer strap will move over to the outer edges of the apertures. From this it will be understood that the width of the apertures 13 must be slightly greater than the distance between the ends of the inner and outer straps. When the inner strap is used, the overlapping ends of the outer strap prevent the members 6 from becoming disconnected from the clamp.

The members 6 are preferably made of the same size for all sizes of hoofs, the adjustment being made entirely by means of the clamp and straps. In order to render this adjustment more accurate, the clamps will be made in several sizes.

Having thus described my invention, what I claim is:—

1. An over shoe for horses comprising a two part slotted member, straps for securing the over shoe to the hoof, an adjustable connecting means having inner and outer metallic straps, said straps having their ends bent to form a hook adapted to be inserted in said slots, as and for the purpose specified.

2. An over shoe for horses comprising a two part slotted member, means for securing the shoe to the hoof, an adjustable connecting member, having outer and inner metallic straps, said straps having their ends bent to form a hook adapted to be inserted in said slots and a bolt extending through said straps, as and for the purpose specified.

3. An overshoe for horses comprising a two part slotted member, straps for securing the overshoes to the hoof, an adjustable connecting means having inner and outer metallic straps, said straps having their ends bent to form a hook adapted to be inserted in said slots, and the ends of said outer straps being overlapped.

4. An overshoe for horses comprising a two part member, straps for securing the overshoe to the hoof, an adjustable connecting means comprising inner and outer straps, either one or both of said straps being adapted to be connected to said two-part member at the same time.

In witness whereof I have hereunto set my hand in the presence of two witnesses.

ALLAN TILLEY.

Witnesses:
C. O. DONAHOE,
I. N. BRANIFF.